United States Patent [19]

Gadonna et al.

[11] Patent Number: 4,528,427
[45] Date of Patent: Jul. 9, 1985

[54] TEST SYSTEM AND DEVICE FOR LOCATING SHORT CIRCUITS AND OPEN CIRCUITS IN A TWO-LEAD LINE

[76] Inventors: Michel P. Gadonna, 148 rue Boucicaut, 92260 Fontenay-aux-Roses; Joël R. Kastler, 3, Sentier des Bas Garmants, 92240 Malakoff, both of France

[21] Appl. No.: 404,914

[22] Filed: Aug. 3, 1982

[30] Foreign Application Priority Data

Aug. 14, 1981 [FR] France ................. 81 15722

[51] Int. Cl.³ ............................................. H04B 3/46
[52] U.S. Cl. ............................... 179/175.3 F; 324/52
[58] Field of Search ............... 179/175.3 F, 175.3 R; 324/52; 340/635, 651, 650, 652

[56] References Cited

U.S. PATENT DOCUMENTS

4,459,437 7/1984 Gabry et al. ............... 179/175.3 F

Primary Examiner—Stafford D. Schreyer
Attorney, Agent, or Firm—Lowe, King, Price & Becker

[57] ABSTRACT

The test system locates short circuits and open circuits in a two-lead line with respect to a test device inserted in the line. A first-frequency (F) detector, a second-frequency (F) generator and a predetermined voltage generator are selectively connected at a test end of the line by a switching facility. The test device comprises one or two circuits for detecting a predetermined in-line current, a circuit for detecting a predetermined in-line voltage, a supply circuit that is energized in response to the detected predetermined current or voltage, a circuit that can detect the second frequency (F) when it is supplied by the supply circuit when energized, and a switching circuit that loops the line across a first-frequency (F) generator in response to the detection of the second frequency (F). The detection of the second frequency (F) and the generation of the first frequency mean that a short circuit or an open circuit is situated in the line section between the test device and the load circuit at the other line end.

47 Claims, 5 Drawing Figures

FIG.1

FIG.2
TEST DEVICE D

TEST SYSTEM AND DEVICE FOR LOCATING SHORT CIRCUITS AND OPEN CIRCUITS IN A TWO-LEAD LINE

BACKGROUND OF THE INVENTION

1. Field of the Invention

The present invention relates to a system for locating short circuits and open circuits with respect to a test device inserted between first and second sections in a two-lead line. The other end of the first line section is selectively connected to means for generating a predetermined voltage and to means for detecting a first predetermined frequency. The test device comprises means series-connected on one of the line leads for detecting the in-line current, means across the line leads for detecting the predetermined voltage and means for generating a signal having the first frequency that modulates the in-line current.

Although the invention is not restricted to this type of embodiment, reference will be made hereinafter to the location of faults in a telephone subscriber two-lead line that links a telephone exchange to a telephone subscriber installation. The faults located by the test system fall into two categories. The first category covers short circuits, loops, insulation defects or low resistance shunts between the two line leads and between one of the line leads and the ground. The second category covers open circuits, breakdowns, cut-offs or high resistances in at least one of the line leads.

2. Description of the Prior Art

A test system as defined above is described in U.S. patent application Ser. No. 339,047 filed on Jan. 13, 1982, now U.S. Pat. No. 4,459,437 and entitled "Test System For Locating Breaks and Short Circuits in a Two-lead Line", now U.S. Pat. No. 4,459,437, dated July 10, 1984.

In this test system, the test device is sensitive to a predetermined voltage level and a predetermined current level. The response upon applying this voltage, respectively this current, is a frequency signal $F_1$, respectively $F_2$, or perhaps $F_3$ when the device comprises second current detecting means on the other line lead. The voltage and current thresholds in this system are high; for instance, the voltage threshold lies at 230 volts d.c. Metal continuity is always required and activation of the frequency generating means in the test device calls for a high voltage which can cause deterioration in teleprocessing equipments and analogous means at the end of a second line section on a subscriber installation side.

Other devices based on voltage threshold detection have been marketed in the United States.

The CIDCOMM (remote line disconnector) test device is activated by a 130 volt d.c. pulse on a line lead with respect to ground. It gives rise to a short circuit for 20 seconds and then an open circuit for the next 20 seconds and reverts to the rest position.

The TII (station disconnect) test device is activated by a 130 volt d.c. voltage pulse on a line lead with respect to ground. It provides an infinite impedance for 25 seconds between any one of the line leads and ground together with an impedance between the line leads of either infinity or amounting to 100 kΩ, depending on the supply bias of the line lead; then it reverts to rest.

The SEISCOR (loop circuit verifier) test device detects an inversion in bias of the 0/48 volt battery voltage at the exchange and in response to this invention emits a 900 Hz tone until such time as the supply bias reverts to the initial state.

The MELCO (remote disconnect device) test device is activated by a 130 volt d.c. voltage pulse on a line lead with respect to ground, and provides a 47 μF capacity in series with a 10 kΩ resistance for 15 seconds between the two line leads; then it reverts to rest.

All these test devices have the drawback of requiring metal continuity and a high activation voltage. Furthermore, they need either a "good" ground connection at the subscriber installation end, usually less than 100 ohms, or line lead marking, or both these constraints simultaneously.

OBJECTS OF THE INVENTION

The main object of this invention is to provide a test system for locating short circuits and/or open circuits in a two-lead line, that does away with the drawbacks posed by the prior test devices.

Another object of this invention is to eliminate the metal continuity that is necessary for activating the prior test devices, thus affording notably the two following prospects:

(1) Possibility of adding the activating means to the test concentration points instead of to the decentralized points or subscriber local exchanges; this implies substantial implementation savings;

(2) Keeping the operating characteristics of the test device when digitizing the subscriber line.

Another object of this invention is to provide a test device having low activation voltages compared to those utilized by the subscriber terminals; the presence of a ground connection at the subscriber installation end is not needed and no line marking is called for.

SUMMARY OF THE INVENTION

With the foregoing in mind, faults in a line including at least one lead and a return path, and preferably having two leads, is determined by selectively connecting to one end of the line a means for detecting a wave having a first frequency on the line and for supplying a wave having a second frequency to the line. A test device connected between the lead and the return path, as well as between first and second sections of the line, includes a fault detector for the line, a source of the first frequency, a detector for the second frequency, and a supply circuit for the detector of the second frequency. The second frequency detector includes active elements requiring a power supply. The supply circuit is activated to supply power to the detector of the second frequency in response to a fault being detected. Switch means loops the first line section across the first frequency source in response to the detector of the second frequency detecting the second frequency. In accordance with one aspect of the invention, the fault being located is a short circuit on the line between the first and second sections and the fault detector includes a current detector in series with the line. In accordance with a further aspect of the invention, the fault being located is an open circuit on the line between the first and second sections. To detect the open circuit, a step voltage source is provided at the one end of the line. The test device includes a voltage detector in shunt across the line and the return path for detecting the step voltage. The invention is directed to the test device per se, as well as to a system including the test device and the various devices at the one end of the line.

Succinctly, the principle behind locating a fault as per the invention involves, as far as the test device is concerned, detecting a signal at the second frequency emitted from a line test desk or rack positioned at said other end of the first line a section and emitting a signal at the first frequency from the test device towards that end. Should the test position, i.e, the test desk, receive the signal at the first frequency, this means the fault is in the second line section or in the line utilization load.

The current detecting means can comprise in parallel with the line terminals thereof, a resistor, a capacitor, two oppositely-poled diodes and first means for cutting-off the current between the supply means and the line when the in-line current is less than a predetermined threshold.

The voltage detecting means can comprise means for charging a first capacitor at said predetermined voltage and second means for cutting-off the current between the supply means and the line when the first capacitor is not being charged. These voltage detecting means can further include timing means for prolonging the excitation period of the second current cutting-off means after the first capacitor has been charged and consequently prolong energization of the supply means with a view to detecting a signal at the second frequency. The timing means includes a second capacitor that charges up with the first capacitor and discharges across the second current cutting-off means after the first capacitor has been charged up.

The supply means comprises a first input terminal connected to one of the line leads and a second input terminal energized by the voltage or current detecting means. The second input terminal, as well as a terminal carrying a voltage intermediate to the voltages of the input terminals, constitute the supply terminals of the second frequency detecting means.

In a preferred embodiment, the second frequency detecting means comprises a bandpass filter tuned to the second frequency and means for converting the filtered signals into a d.c. voltage for controlling the switching means. The second frequency detecting means can further comprise timing means for controlling the switching means when the filtered signal exceeds a predetermined duration, in order to eliminate any unforeseen switching due to detection of a speech signal perhaps at the second frequency.

The switching means preferably comprises a relay controlling a switch that selectively connects the first line section either to the second line section or to the first frequency generation means, and means for activating the relay in response to detection of the second frequency.

So as to obviate any line lead bias problems, the test device comprises a first diode bridge having two first opposite terminals whose connected to the line leads and whose two second opposite terminals connected to the terminals of the voltage detecting means. One of the diode bridge second terminals constitutes an input terminal common to the supply means and to the second frequency detecting means and a supply terminal of a relay activating means included in the switching means.

The first frequency generating means can comprise second supply means from the in-line voltage after looping controlled by the switching means, means for oscillating at the first frequency once the second supply means have supplied and means connected across the second supply means for modulating the in-line current by the first frequency signal delivered by the oscillating means.

BRIEF DESCRIPTION OF THE DRAWING

Further objects and advantages of this invention will become more apparent from the following description of preferred embodiments of the invention as illustrated in the accompanying drawings in which.

DESCRIPTION OF THE PREFERRED EMBODIMENTS

Figure 1:
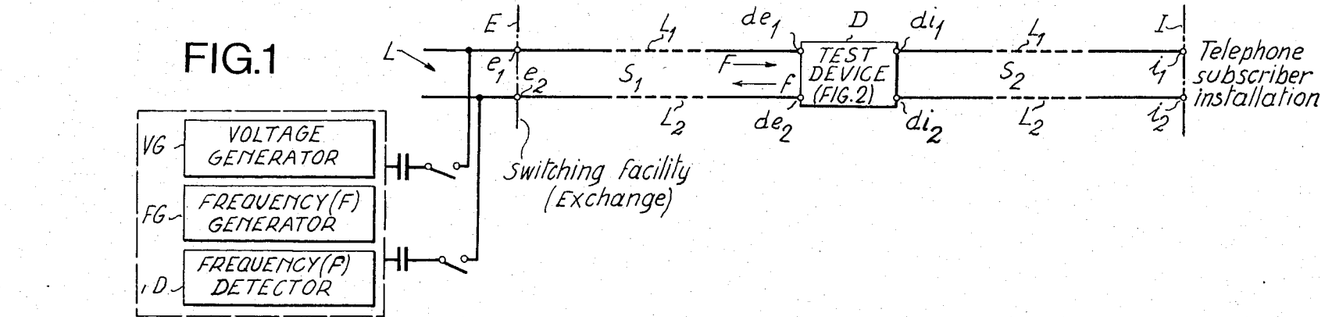
FIG. 1 is a schematic block diagram of a test system embodying the invention for locating faults in a telephone subscriber line.

With reference to FIG. 1, depicted is a preferred embodiment of the test system. This system relates to a telephone subscriber line L having two leads $L_1$, $L_2$ having first ends $e_1$, $e_2$ connected to test switching means E associated with a switching facility such as the local telephone exchange and second ends $i_1$, $i_2$ connected to the input terminals of a load circuit such as a telephone subscriber installation I or a private automatic branch exchange (P.A.B.X.). The test device D includes a quadrupole which has two pairs of terminals $de_1$, $de_2$ and $di_1$, $di_2$ and which is series-connected on line L. Device D divides the line L into a first section $S_1$ which is situated between the terminal pairs $e_1-e_2$ and $de_1-de_2$, and a second section $S_2$ which is situated between the terminal pairs $di_1-di_2$ and $i_1-i_2$.

From switching facility E, the line L in question may be selected from among all the telephone subscriber lines served by the local exchange and measure certain electrical magnitudes characterizing this particular line so as to detect a fault such as a short circuit or open circuit.

As will be seen hereinafter, the operation of the test device D embodying the invention requires a voltage generator VG at the switching facility—that is available in currently used test desks or test racks—a generator FG for producing a signal at a second predetermined frequency F transmitted along the line in order to activate the test device D and a detector fD for detecting a signal at a first predetermined frequency f along the line which is emitted by the test device D in response to its activation. The first and second frequencies lie within the telephone signal frequency band and have values of f=800 Hz and F=3400 Hz, for example. The frequency detector fD can thus consist of a loud speaker or the telephone listening piece located at the switching facility E.

Figure 2:
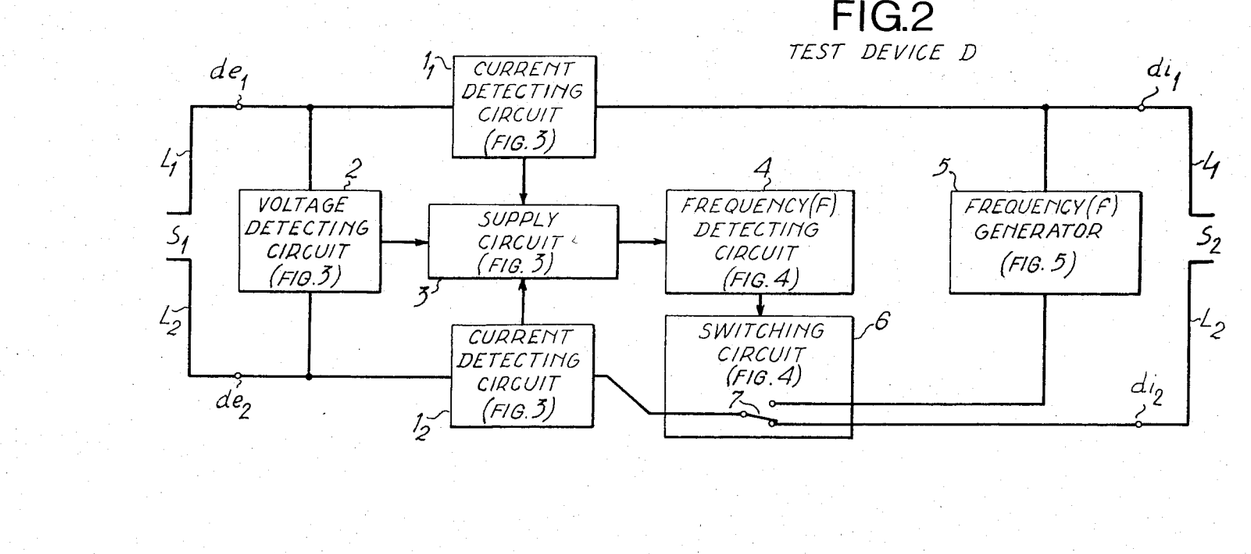
FIG. 2 is a block diagram of a complete test device embodying the invention.

FIG. 2 is a block diagram of a complete test device D embodying the invention. Device D comprises:

two current detecting circuits $1_1$ and $1_2$ that are respectively connected in series between the terminals $de_1$ and $di_1$ on the line lead $L_1$ and between the terminals de₂ and dp₂ on the line lead L₂ and that are intended to locate in-line short circuits;

a voltage detecting circuit 2 that is connected in parallel between the terminals de₁ and de₂ of the test device and that is intended to locate in-line open circuits;

a supply circuit 3 that is activated either in response to a weak current detected by current detecting circuit 1₁ or 1₂, or in response to a predetermined voltage step detected by voltage detecting circuit 2;

a frequency detecting circuit 4 which, when energized by supply circuit 3, can detect the second frequency F emitted by the generator FG;

a frequency generator 5 selectively connected across the test device terminals di₁ and di₂; and a switching circuit 6 controlled by frequency detecting circuit 4 for looping the line L across frequency generator 5 so that the first frequency f is coupled to the line in response to circuit 4 detecting the second frequency F.

Figure 3:
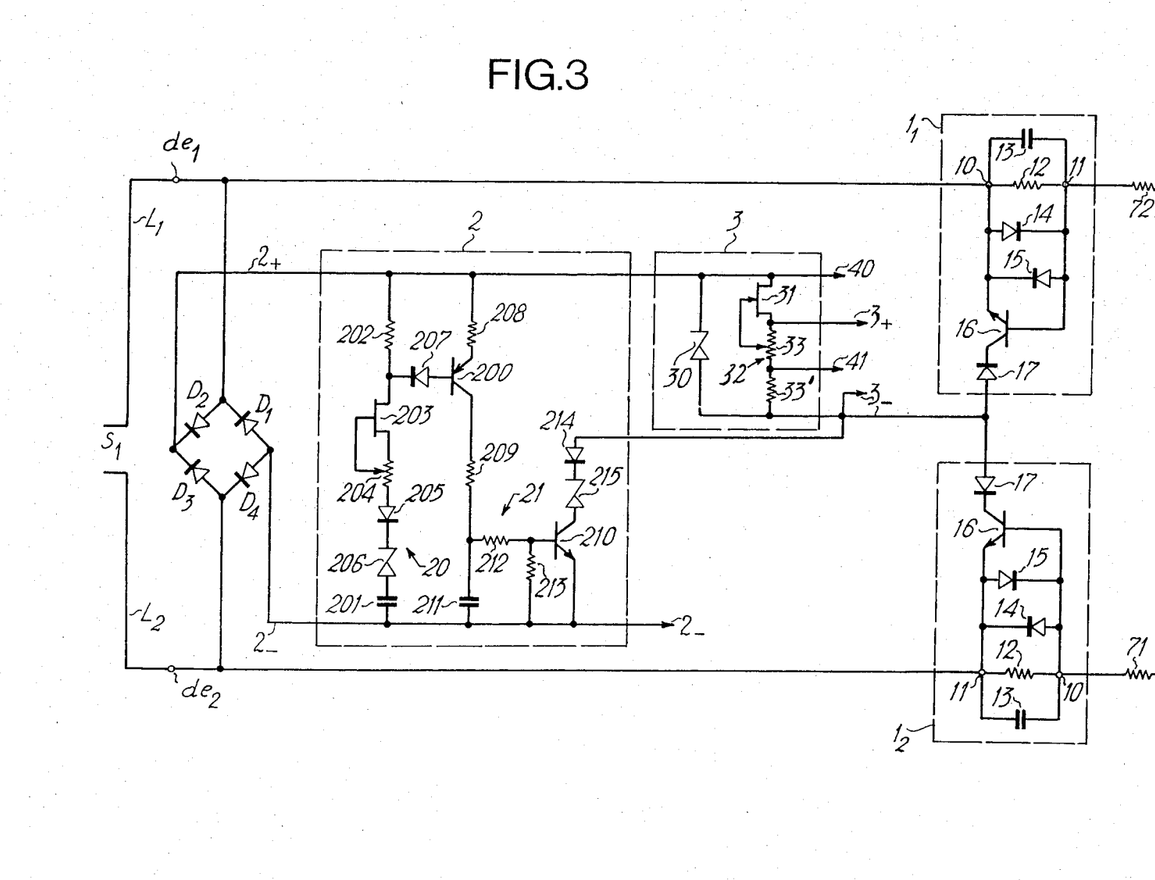
FIG. 3 is a detailed block diagram of the current detecting circuits, voltage detecting circuit and supply circuit in the test device according to a preferred embodiment.

Circuits 1₁, 1₂, 2 and 3 are detailed in FIG. 3.

A description will first of all be given of current detecting circuit 1₁; because current detecting circuits 1₁ and 1₂ are identical a description of circuit 1₁ supplies for both. Current detecting circuit 1₁ comprises terminals 10 and 11, connected in line L₁. Across terminals 10 and 11 and in parallel with each other are a resistor 12, a capacitor 13, two oppositely-poled diodes 14 and 15 and the base-emitter junction of an npn bipolar transistor 16. Capacitor 13 decouples resistor 12 during alternating or pulsing currents. Diodes 14 and 15 protect transistor 16 which acts as an electronic switch for supply circuit 3. Indeed, the collector of transistor 16 is connected to negatively biased terminal 3₋ of supply circuit 3 across a diode 17.

Voltage detecting circuit 2 is biased by and is connected in a conventional manner across the diagonal of a rectifying bridge which comprises diodes D₁, D₂, D₃, D₄. The cathode of diode D₁ and the anode of diode D₂ are connected to the terminal de₁ on the line lead L₁ whereas the anode of diode D₃ and the cathode of diode D₄ are connected to the terminal de₂ on the line lead L₂. The cathodes of diodes D₂ and D₃ are connected to the positively biased terminal 2₊ of circuit 2 whilst the anodes of diodes D₁ and D₄ are connected to the negatively biased terminal 2₋ of circuit 2.

Between terminals 2₊ and 2₋, voltage detecting circuit 2 comprises a voltage step detecting circuit 20 that is structured around a pnp bipolar transistor 200 and a capacitor 201 and that controls an electronic "switch" 21 built around a transistor 210 and timing capacitor 211.

Circuit 20 comprises a base circuit of the transistor 200 which, between terminals 2₊ and 2₋, includes the following components in series: a resistor 202, the drain-source junction of a field-effect transistor 203, a resistive voltage divider 204, a simple diode 205, a Zener diode 206 and the capacitor 201. The terminal common to the resistor 202 and the drain of transistor 203 is connected to the base of transistor 200 across a simple diode 207. The gate of FET transistor 203 is connected to the voltage dividing point of divider 204. Connected in series between terminals 2₊ and 2₋ are emitter resistor 208, the emitter-collector path of pnp bipolar transistor 200, a collector resistor 209 and the capacitor 211.

Electronic switch 21 also comprises a resistive input circuit containing a series resistor 212, having one terminal connected to the terminal common to resistor 209 and capacitor 211, and a shunt bias resistor 213 between negative terminal 2₋ and the terminal common to resistor 212 and the base of the npn bipolar transistor 210. Transistor 210 is connected in a common-emitter circuit configuration; its emitter is connected to terminal 2₋ and its collector to negative terminal 3₋ of the supply circuit across a Zener diode 215 and a simple diode 214.

Supply circuit 3 comprises between terminals 2₊ and 3₋, on the one hand, a Zener diode 30 and, on the other hand, a series-circuit including the drain-source junction of a field-effect transistor 31, a resistive voltage divider 32 formed by a potentiometer 33, connected in series with resistor 33'. The gate of the transistor 31 is connected to a tap of voltage divider 32. The supply circuit has four output terminals 3₊, 3₋, 40 and 41. Output terminals 3₊ and 3₋ supply integrated circuits 430, 440 and 450 (as will be seen hereinafter) in frequency detecting circuit 4; terminal 3₊ is common to the source of transistor 31 and to voltage divider 32, and terminal 3₋ is common to the anode of diode 30, to the anodes of diodes 17 in current detectors 1₁ and 1₂ and to the anodes of diode 214. Terminal 40 is connected directly to the supply voltage coupled to terminal 2₊ while terminal 41 is a common terminal of resistor 33' and potentiometer 33. Terminals 40 and 41 feed the signal received at the second frequency F to input terminals 40 and 41 of frequency detecting circuit 4.

The principle behind activating supply circuit 3 for circuit 4 to detect frequency F is as follows:

Should the in-line fault that has been detected at the switching facility E be a short circuit, one or both of current detecting circuits 1₁ and 1₂ is activated if the short circuit is located beyond the test device D, in the second line section S₂. Circuit 1₁ is activated for obvious short circuits between the lead L₁ and ground and circuit 1₂ is used for obvious short circuits between the lead L₂ and ground; both circuits 1₁ and 1₂ are activated for short circuits between the two line leads L₁ and L₂.

As regards detecting a short circuit, reference is made below to current detecting circuit 1₁, for instance. If a current is flowing in the line L and the short circuit lies in the section S₂ on the subscriber installation I side, then the current passes through the diode D₂ or D₃, the drain-source junction of transistor 31, voltage divider 32 formed by potentiometer 33, resistor 33' and diode 17, which turns on transistor 16. In this case, the supply circuit 3 is excited. Energizing voltages are supplied by terminals 3₊, 3₋, 40 and 41 to frequency detecting circuit 4. The potentiometer 33 of voltage divider 32 serves as a regulator for the current flowing through transistor 31 that is protected against overvoltages by Zener diode 30. Voltage divider 32 formed by potentiometer 33 balances the voltages between terminals 3₊ and 3₋ relative to the voltage at terminal 41 which is such that $V(41)=(V(3_+)+V(3_-))/2$. The potential difference $V(3_+)-V(3_-)$ across terminals 3₊ and 3₋ is choosen in practice to be equal to 4 volts.

Should the in-line fault detected at the switching facility E be an open circuit beyond the test device D and located in the second line S₂ on the subscriber installation I side, voltage detecting circuit 2 is activated. At the beginning of the locating procedure, the line is not supplied from position E and capacitors 201 and 211 are uncharged. When a voltage step is fed into the end of line e₁, e₂ by the generator VG, the first capacitor 201 slowly charges up at a low constant current through the diode D₂ or D₃, terminal 2₊, resistor 202, the transistor 203 drain-source junction, voltage divider 204, diode 205 and Zener diode 206. The current flowing through resistor 202 turns on transistor 200 whose collector-emitter current charges the second capacitor 211 and, via resistors 212 and 213, closes the electronic switch including transistor 210, which is turned on. Until such time as first capacitor 201 is fully charged, second capacitor 211 is held in the charged state. Then in response to the charging completion of capacitor 201, transistor 200 is turned off and second capacitor 211 discharges into components 212, 213 and 210.

Capacitor 211 thus plays a timing role which extends the predetermined conduction time of transistor 210; this time period is hence equal to the sum of the charging time of the first capacitor 201 plus the discharging time of the second capacitor 211. Throughout this predetermined time, the current flows across components $D_2$ or $D_3$, 31, 32 and 33, as in the event of locating a short circuit, thus activating supply circuit 3, and also across components 214, 215, 210 and $D_4$ or $D_1$. In the absence of a signal at the second frequency F in the line L, the voltages at terminals $3_+$, $3_-$ and 41 are available practically throughout a period of around one minute. Zener diode 215 associated with switch 21 has a threshold voltage of some 22 volts and prevents a voltage from being fed across terminals $2_+$ and $3_-$ which would forward-bias Zener diode 30 and hence shunt supply circuit 3 and consequently frequency detection circuit 4 during reception of the signal at the second frequency F.

Figure 4:
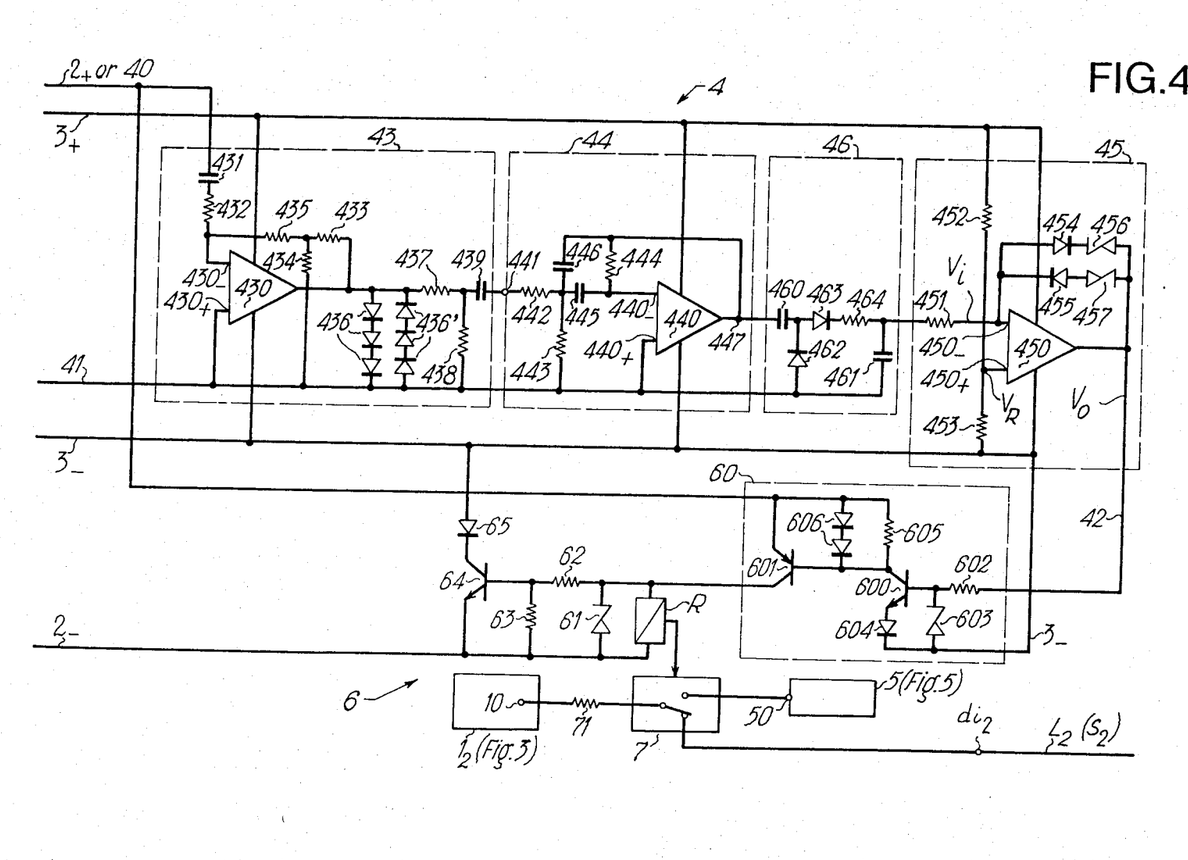
FIG. 4 is a detailed block diagram of the second frequency detecting circuit and switching circuit in the test device.

Reference will now be made to FIG. 4.

Circuit 4 for detecting the second frequency F essentially comprises between its input terminals 40, 41 and output terminal 42, an amplifying circuit 43, a bandpass filter 44 and a voltage comparing circuit 45. Circuits 43, 44 and 45 are respectively arranged around operational amplifiers 430, 440 and 450 that are fed via terminals $3_+$ and $3_-$ of supply circuit 3. The operational amplifiers draw a very low current and operate at a very small supply voltage value which in one preferred embodiment is ±1.2 volt.

The inverse or negative input $430_-$ of amplifier 430 is coupled to terminal 40 via a capacitor 431, series connected with an input resistor 432. Amplifier circuit 43 has high gain with high input impedance; the resistive feedback loop of amplifier 430 is made up of a resistive bridged T network which includes two resistors 433 and 434 in series between the output from amplifier 430 and its direct or positive input $430_+$ connected to terminal 41, together with a resistor 435 between negative input $430_-$ and the terminal common to resistors 433 and 434. The gain of circuit 43 depends on the ratio: ((resistance 433+resistance 435)/(resistance 432)) and in practice, is equal to 20 dB. The input impedance of circuit 43 is greater than 1MΩ such that the signals transmitted along the line are not affected. The output from circuit 43 is protected by two series of oppositely-poled diodes, 436 and 436', between the amplifier 430 output and terminal 41, where the typical bottoming voltage is ±1.5 volt. The output signal from amplifier 43 is taken from input 441 of filter 44 across a voltage dividing bridge including resistors 437 and 438 and a coupling capacitor 439, to avoid the ON state of the input into second amplifier 440.

Filter 44 is of the second-order conventional bandpass type with multiple negative feedback. Its transmission band is centered on the second frequency F=3400 Hz that is delivered from the frequency generator FG in the switching facility E. The Q-factor and the gain of the filter 44 for the central frequency F are equal to 10.

Filter 44 comprises three resistors 442, 443 and 444 as well as two capacitors 445 and 446. One of the terminals of resistor 442 is connected to input 441 of filter 44 whilst the other is connected to capacitors 445 and 446 and resistor 443. The inverse input $440_-$ of the amplifier 440 is connected to the other terminal on capacitor 445 and one terminal of resistor 444. The positive terminal $440_+$ of amplifier 440 is connected to terminal 41 and the other terminal of resistor 443. The other terminals of capacitor 446 and resistor 444 are connected to the output 447 of amplifier 440.

The signal at output 447 of filter 44 is delivered to a full-wave rectifier 46, including two capacitors 460 and 461, two diodes 462 and 463 and a resistor 464. One of the terminals of capacitor 460 is linked to output terminal 447 of filter 44 whilst its other terminal is linked to the diode 462 cathode and the diode 463 anode. The diode 463 is series-connected to resistor 464. The diode 462 anode and one terminal of capacitor 461 are connected to terminal 41. The other terminals of resistor 464 and capacitor 461 are connected to an input resistor 451 of voltage comparing circuit 45. Rectifier 46 is therefore of the conventional type apart from the presence of resistor 464 that contributes in delaying the charging of output capacitor 461. As a result of this, the rectifier rectifies only one signal at the second frequency F whose duration exceeds a predetermined value, equal in practice to 300 ms. These conditions prevent the test device from being activated by speech signals at the frequency F.

Voltage comparing circuit 45 compares the rectified input voltage $V_i$ (applied to the inverse input $450_-$ of amplifier 450 via the resistor 451) with a reference voltage $V_R$ that is applied to direct input $450_+$ of amplifier 450. The reference voltage $V_R$ appears at the terminal common to two resistors 452 and 453 that are connected to supply terminals $3_+$ and $3_-$ respectively. Resistors 452 and 453 carry very high ohmic values; the sum of these values is approximately 1MΩ such that the reference voltage $V_R$ is equal to about $0.7(V(3_+)-V(3_-))$.

The feedback loop of amplifier 450 across input inverse terminal $450_-$ and its output terminal 42 includes two series of oppositely-poled diodes, each comprising a simple diode 454, 455 and a Zener diode 456, 457. Zener diodes 456 and 457 act as overload limiters and simple diodes 454 and 456 have high resistances. Since the feedback resistance is the inverse of the diode resistance, amplifier 450 has a very high gain and is turned on at rather low voltage differences $V_R$-$V_i$, less than a millivolt. As the reference voltage $V_R$ is dependent on the supply voltages at terminals $3_+$ and $3_-$, it can be lower than ±2 volts, whilst still activating amplifier 450 under certain circumstances, such as in the presence of a short circuit at the end, installation I side, of a long line. The voltage $V_0$ at output 42 is therefore the outcome of comparing voltages $V_i$ and $V_R$ and, generally speaking, of converting the outgoing signal from filter 44 into a d.c. voltage by means of circuits 46 and 45. The voltage $V_0$ equals $V(3_-)$ if $V_i < V_R$ which means that no signal having the second frequency F has been detected, and equals $V(3_+)$ if $V_i \geq V_R$ in response to a signal at the second frequency F lasting at least 300 ms. In the latter case, the voltage $V_0$ is sufficient to energize switching circuit 6 so that this circuit 6 can loop the line via frequency generator 5 and open the line loop made up of the second line section $S_2$ and the installation I.

Figure 5:
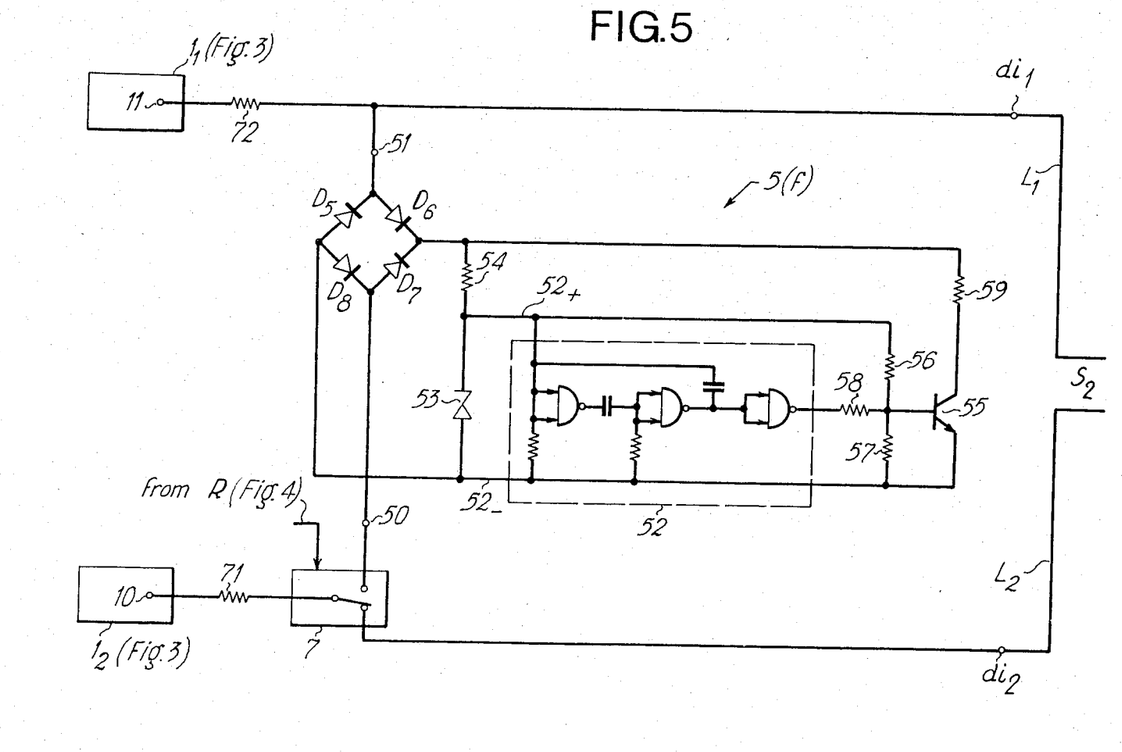
FIG. 5 is a detailed block diagram of the first frequency generator in the test device.

Switching circuit 6 shown in FIG. 4 contains means 60 for activating a relay R controlling switch 7 having two stationary states with no intermediate state. Relay R is connected in one of the line leads in section $S_2$, lead $L_2$ for instance as illustrated in FIGS. 2, 4 and 5. The movable contact of switch 7 connects terminal 10 of current detecting circuit $1_2$, common to the base on its transistor 16, and the terminal $di_2$ of test device D across a resistor 71, as depicted in the drawing, when no signal at the frequency F has been detected, i.e. when $V_i < V_R$. On the other hand, in response to a signal at the frequency F having been detected and $V_R \geq V_i$, the movable contact of switch 7 links terminal 50 of the frequency generator 5 to the lead $L_2$ of the first line section $S_1$ via resistor 71 and circuit $1_2$. As shown in FIG. 5, this loops the line via resistor 72 to generator 5, having another terminal 51 linked to the terminal $di_1$ of the test device D and to terminal 11 of current detecting circuit $1_1$; this allows the first frequency f to be retransmitted toward the switching facility E.

In the embodiment mode depicted in FIG. 4, switching circuit 6 comprises a circuit 60 for controlling the relay R. Circuit 60 includes an npn bipolar transistor 600 and a pnp bipolar transistor 601. The base of transistor 600 is connected to terminal 42 across a resistor 602 and to terminal $3_-$ via a Zener diode 603. The emitter of transistor 600 is connected to terminal $3_-$ via a simple diode 604. The collector of transistor 600 is connected to the base of second transistor 601 as well as to one terminal of a resistor 605 and two series-connected simple diodes 606 having other terminals connected to terminal $2_+$ and the emitter of transistor 601. Diodes 606 and 603 serve as limiters for the base-emitter voltage of transistors 600 and 601. When the voltage $V_0$ at output 42 of voltage comparing circuit 45 is at a high logic state ($V_i \geq V_R$), transistor 600 is turned on, so that the collector current flowing through resistor 605 turns on transistor 601. This current activates the relay R coil that is interconnected between the collector of transistor 601 and the terminal $2_-$, when the transistor 601 supply voltage—or that leaving the diode bridge $D_1$ through $D_4$— between terminals $2_+$ and $2_-$ is greater than 4 volts.

Provided in parallel with the relay R coil are a Zener diode 61 that protects the relay against overvoltage, as well as a voltage dividing bridge that is made of resistors 62 and 63 that enables an npn bipolar transistor 64 to be in a conducting state. The base of transistor 64 is connected to a terminal common to resistors 62 and 63. The other terminal of resistor 62 is connected to the terminal common to Zener diode 61, relay R coil and the transistor 601 collector. Terminal $2_-$ is also connected to the emitter of transistor 601 and to the other terminal of resistor 63. The collector of transistor 64 is connected to terminal $3_-$ via a single diode 65. Transistor 64 is equivalent to a means for holding the supply voltage of test device D when the relay R is activated.

A preferred embodiment of first frequency generator 5 is depicted in FIG. 5. Generator 5 comprises a conventional oscillator 52, such as a three-step multivibrator that oscillates at the first frequency $f=800$ Hz. A Zener diode 53 regulates the voltage between supply terminals $52_+$ and $52_-$ of multivibrator 52. The cathode Zener of diode 53 is connected via a resistor 54 to the cathodes of two diodes $D_6$ and $D_7$ in a diode bridge. The anode of Zener diode 53 is connected to the anodes of the other diodes $D_5$ and $D_8$ included in said diode bridge. The other terminals of diodes $D_5$ and $D_6$ and diodes $D_7$ and $D_8$ are connected to already-mentioned terminals 51 and 50 of generator 5 respectively.

The output of multivibrator 52 is coupled to the line L via an npn bipolar transistor 55. Resistors 56, 57 and 58 are connected to the base of transistor 55 and connected to supply terminals $52_+$, $52_-$ and the output terminal of the multivibrator 52 respectively. The emitter of transistor 55 is connected to terminal $52_-$. The collector of transistor 55 is connected to the cathodes of diodes $D_6$ and $D_7$ via a resistor 59.

The output voltage from multivibrator 52 modifies the base-emitter voltage of transistor 55 that modulates the inline current at the first frequency f when switch 7 links terminal 50 to lead $L_2$ of the first line section $S_1$ switch 7 responds to a signal at the second frequency F, i.e. when there is no open circuit or short circuit in the first line section $S_1$; this means that the open circuit or short circuit that has been detected at the switching facility E is located in the second line section $S_2$ or in the subscriber installation I. Reciprocally, should no first frequency f be received by the frequency detector fD at the switching facility E, then the fault, open circuit or short circuit, lies in the first line section $S_1$.

A test system embodying the invention may further comprise a plurality of test devices D. The number and location of devices D are chosen as functions of line length and line accessibility positions. To distinguish between fault locations, the activation frequency F and response frequency f peculiar to each test device are respectively different from those of other test devices. A lay-out of this nature then permits section-by-section fault location. In this case, the generator FG and detector fD at the switching facility are multifrequency devices corresponding to the predetermined frequencies F and f of the test devices.

Moreover, although the invention has been described in reference to a test system for a telephone subscriber loop, the operating principles of the system embodying the invention may equally well be applied to faulty locations in other circuits of the two-lead line type, one end of which is connected to an electronic circuit such as data measurement or data recording equipment or analogous equipment that is remotely controlled at the other end of the line by means of a central unit. Mention can be made in particular to systems coming within the spirit and scope of the invention such as that described above for locating faults along any two-lead line of the telephone, telex or special-purpose type, regardless of the load circuit that is served by the line.

The diverse variants of the test device, as such, also come within the scope of the invention.

What we claim is:

1. A test device adapted to be connected in a system for locating short circuits and open circuits in a two-lead line, the test device being adapted to be connected in said line at a position to divide the line into first and second line sections; the system including: means selectively connected to one end of said first line section for generating a predetermined voltage, means selectively connected to said one end of said first line section for detecting a first predetermined frequency, and means selectively connected to said one end of said first line section for generating a second predetermined frequency;

said test device comprising:
means series-connected with one of said line leads for detecting an in-line current;
means connected across said line for detecting said predetermined voltage;

means for generating a signal having said first frequency for modulating said in-line current;
voltage supply means energized either in response to said in-line current detected by said current detecting means or in response to said predetermined voltage detected by said voltage detecting means;
means supplied by said supply means for detecting a signal having the second frequency in said line; and
switching means for looping said first line section across said first frequency generating means in response to detection of said second frequency.

2. A test device as claimed in claim 1 wherein said current detecting means comprises parallel-connected between their terminals, a resistor, a capacitor, two oppositely-poled diodes and means for cutting-off the current between said supply means and said line when the in-line current is less than a predetermined threshold.

3. A test device as claimed in claim 2 wherein said current cutting-off means comprises a transistor having a baseemitter junction in parallel with the terminals of said current detecting means and a collector connected to one of the terminals on said supply means.

4. A test device as claimed in claim 3 wherein at least one diode is connected between said transistor collector and said terminal of said supply means.

5. A test device as claimed in claim 1 wherein said test device comprises other current detecting means series-connected on the other lead of said line.

6. A test device as claimed in claim 1 or 5 wherein said voltage detecting means comprises means for charging a first capacitor at said predetermined voltage and means for cutting-off the current between said supply means and said line when said first capacitor is not being charged.

7. A test device as claimed in claim 6 wherein said charging means comprises a transistor connected in a common emitter mode between the terminals of said voltage detecting means, the base circuit of said transistor including said first capacitor and the collector of said transistor controlling said current cutting-off means.

8. A test device as claimed in claim 7 wherein said transistor base circuit includes series-connected with said first capacitor at least one of elements such as a resistor, a transistor, an adjustable resistor, a simple diode and a Zener diode.

9. A test device as claimed in claim 7 wherein said current cutting-off means comprises a transistor having a base responsive to the current of said charging means transistor and having a collector-emitter path connected to one of the terminals of said supply means and to one of the terminals of said voltage detecting means.

10. A test device as claimed in claim 9 wherein the collector of said transistor in said current cutting-off means is connected to said terminal of said supply means across at least one Zener diode.

11. A test device as claimed in claim 6 wherein said voltage detecting means comprises timing means for extending the excitation period of said current cutting-off means after said first capacitor has been charged up.

12. A test device as claimed in claim 11 wherein said timing means comprises a second capacitor connected to be charged up with said first capacitor and to discharge across said current cutting-off means after said first capacitor has been charged up.

13. A test device as claimed in claim 9 in which said voltage detecting means comprises a second capacitor connected to be charged up with said first capacitor and discharged across said current cutting-off means after said first capacitor has been charged up, and that is interconnected between said terminal of said voltage detecting means and a terminal that is common to said transistor collector in said charging means and to a base of the transistor of said current cutting-off means.

14. A test device as claimed in claim 1 wherein said supply means comprises a first input terminal connected to one of said line leads and a second input terminal energized by either said current detecting means or said voltage detecting means.

15. A test device as claimed in claim 14 wherein said supply means comprises in series, between the input terminals thereof, a transistor and two resistors, the terminal common to the transistor and one of said resistors constituting a supply terminal of said second frequency detecting means having another supply terminal forming said input terminal to be energized.

16. A test device as claimed in claim 15 wherein said supply means comprises a Zener diode, the Zener diode being connected between the input terminals of the supply means.

17. A test device as claimed in claim 1 wherein said second frequency detecting means comprises a bandpass filter tuned to said second frequency for deriving a filtered signal, and means for converting the filtered signal into a direct voltage controlling said switching means.

18. A test device as claimed in claim 17 wherein said converting means comprises means for full-wave rectifying said filtered signal into a rectified voltage and means for comparing said rectified voltage with a reference voltage dependent on the supply means to obtain said control voltage when said rectified voltage is greater than said reference voltage.

19. A test device as claimed in claim 18 wherein said voltage comparing means comprises an amplifier having a feedback loop including two parallel channels each having at least one Zener diode, the Zener diodes of the parallel channels being oppositely-poled with respect to the other.

20. A test device as claimed in claim 18 wherein said rectifying means comprises a resistor connected between the diode and the capacitor across an output of said rectifying means.

21. A test device as claimed in claim 17 wherein said second frequency detecting means comprises timing means for controlling said switching means when the duration of said filtered signal exceeds a predetermined time.

22. A test device as claimed in claim 17 wherein said second frequency detecting means comprises amplifying means with a resistive bridged T feedback loop having an output connected to be protected by two series of oppositely-poled diodes.

23. A test device as claimed in claim 22 wherein each of said amplifying means, said bandpass filter and said converting means comprises an operational amplifier fed by said supply means.

24. A test device as claimed in claim 1 wherein said switching means comprises a relay for controlling a switch for selectively connecting said first line section either to said second line section or to said first frequency generating means, and means for activating said relay in response to detection of said second frequency signal.

25. A test device as claimed in claim 24 in which said second frequency detecting means comprises a bandpass filter tuned to said second frequency and means for converting the filtered signal into a direct voltage for controlling said switching means, said relay switching means comprising a first transistor stage that is fed by a terminal of said supply means energized by either said current detecting means or said voltage detecting means, the first transistor stage being connected to be controlled by said direct voltage, a second transistor stage energized by said line for selectively supplying current to a coil of said relay, the second transistor being connected to be controlled by said first transistor stage.

26. A test device as claimed in claim 25 wherein said switching means comprises a third transistor stage connected to the output of said second transistor for holding the supply voltage in said supply means when the relay has been activated.

27. A test device as claimed in claimed 24, 25 or 26 wherein said switching means comprises a Zener diode in parallel with a coil of said relay.

28. A test device as claimed in claim 1 comprising a diode bridge having two first opposite terminals connected to said line leads and two second opposite terminals connected to terminals of said voltage detecting means, one of said second terminals of said diode bridge constituting an input terminal common to said supply means and said second frequency detecting means and a supply terminal of a relay activating means included in said switching means.

29. A test device as claimed in claim 1, wherein said first frequency generating means comprises second supply means from the in-line voltage after looping controlled by said switching means, means for oscillating at said first frequency following supply by said second supply means and means parallel-connected with said second supply means for modulating the in-line current by said first frequency signal delivered by said oscillating means.

30. A test device as claimed in claim 29 wherein said second supply means comprises a Zener diode that is interconnected to the supply terminals of said oscillating means and that is series-connected with a resistor between the terminals of said first frequency generating means.

31. A test device as claimed in claim 29 wherein said oscillating means comprises a multivibrator.

32. A test device as claimed in claim 29 wherein said modulating means comprises a transistor stage connected between the terminals of said first frequency generating means and controlled by said first frequency signal derived by said oscillating means.

33. A test device as claimed in claim 29 comprising a diode bridge having two opposite terminals selectively connected to the line leads through said switching means and two other opposite terminals which constitute the terminals of said first frequency generating means.

34. A test device as claimed in claim 1 wherein said first frequency detecting means comprises a loud speaker.

35. A test device as claimed in claim 1 wherein said first frequency detecting means comprises the listening piece of a telephone set.

36. A test device as claimed in claim 1 wherein said first and second frequencies lie in the telephone frequency bandwidth.

37. A test device adapted to be connected in a system for locating short circuits in a two-lead line, the test device being adapted to be connected in said line at a position to divide the line into first and second line sections, the system including: means selectively connected to one end of said first line section for detecting a first predetermined frequency, and means selectively connected to said one end of said first line section for generating a second predetermined frequency;
said test device comprising:
means series-connected with one of said line leads for detecting an in-line current;
means for generating a signal having said first frequency for modulating said in-line current;
voltage supply means energized in response to said in-line current detected by said current detecting means and corresponding to said predetermined voltage;
means supplied by said supply means for detecting a signal having the second frequency in said line; and
switching means for looping said first line section across said first frequency generating means in response to detection of said second frequency.

38. A test device as claimed in claim 37 wherein said test device comprises another current detecting means series-connected on the other lead of said line.

39. A test device adapted to be connected in a system for locating open circuits in a two-lead line, the test device being adapted to be connected in said line at a position to divide the line into first and second line sections, the system including: means selectively connected to one end of said first line section for generating a predetermined voltage, means selectively connected to said one end of said first line section for detecting a first predetermined frequency, and means selectively connected to said one end of said first line section for generating a second predetermined frequency;
said test device comprising:
means connected across said line for detecting said predetermined voltage;
means for generating a signal having said first frequency for modulating an in-line current on one of said lead lines;
voltage supply means energized in response to said predetermined voltage detected by said voltage detecting means;
means supplied by said supply means for detecting a signal having the second frequency in said line; and
switching means for looping said first line section across said first frequency generating means in response to detection of said second frequency.

40. A system for locating faults in a line including at least one lead and a return path, the line having a first end and first and second sections, comprising means selectively connected to said first end for detecting a wave having a first frequency on the line and for supplying a wave having a second frequency to the line; a test device connected between said one lead and the return path, as well as between said first and second sections, said test device including: a fault detector for the line, a source of the first frequency, a detector for the second frequency, the second frequency detector including active elements requiring a power supply, a supply circuit for the detector of the second frequency, means for activating the supply circuit to supply power to the detector of the second frequency in response to a fault being detected, and switch means for looping said first line section across said first frequency source in response to the detector of the second frequency detecting the second frequency.

41. The system of claim 40 wherein the fault being located is a short circuit on the line between the first and second sections, and the fault detector comprises a current detector in series with said line.

42. The system of claim 41 wherein the test device includes a rectifier for converting the first frequency to a d.c. voltage, the supply circuit being powered by the d.c. voltage in response to the current detector detecting a short circuit.

43. The system of claim 40 wherein the fault being located is an open circuit on the line between the first and second sections, the means at said one end including a predetermined step voltage source, the test device including a voltage detector in shunt across the line and the return path for detecting the step voltage.

44. The system of claim 43 wherein the test device includes a rectifier for converting the first frequency to a d.c. voltage, the supply circuit being powered by the d.c. voltage in response to the voltage detector detecting an open circuit.

45. The system of claim 44 wherein the voltage detector includes elements requiring a d.c. power supply, said elements of the voltage detector being powered by the d.c. voltage converted by the rectifier.

46. The system of claim 40 wherein the test device includes a rectifier for converting the first frequency to a d.c. voltage, the supply circuit being powered by the d.c. voltage in response to the fault detector detecting a fault.

47. The system of claim 40 wherein said line includes more than two sections, a test device being connected between adjacent pairs of said sections, each of said test devices including the defined devices in the test device connected between the first and second sections, the first frequency and second frequencies of all of the test devices differing from each other, and further including at said first end: means for individually detecting the first frequency derived by the first frequency source of each of said test devices, and means for deriving the second frequency detected by the second frequency detector of each of said test devices.

* * * * *